United States Patent Office 3,513,003
Patented May 19, 1970

3,513,003
HEAT REACTIVE COLORED GLASS
AND PROCESS
Friedrich W. Hammer and John Jasinski, Toledo, Ohio, assignors to Owens-Illinois, Inc., a corporation of Ohio
No Drawing. Filed Sept. 7, 1965, Ser. No. 485,605
Int. Cl. C03b; C03c 3/04, 15/00
U.S. Cl. 106—52
7 Claims

ABSTRACT OF THE DISCLOSURE

New colored glasses are prepared from sulfur or sulfide containing amber glass compositions to which have been added nickel oxide, or copper oxide, or a metal oxide selected from the group of metal oxides of arsenic, antimony, lead, manganese, cerium and molybdenum by first forming an amber colored glass from such compositions which is capable of being heat treated to "strike" or convert the glass to a different color. The different color is produced by subjecting the amber glass to a temperature in the range of from about 1050–1200° F. to convert the nickel or copper or other named metal oxide from an oxide to a colored sulfide.

---

This invention relates to the manufacture of colored glasses and more particularly to the manufacture of colored glasses by an improved forehearth colorant technique, followed by striking the finished ware.

Further, this invention relates to the novel glass compositions made by adding a colorant to an amber base glass.

Still further the invention relates to novel "black glasses" and process for production.

THE PROBLEM: FULL MELTER OPERATION

In the earlier art of making colored glass, it was the practice to add the colorant material to the melter in admixture with other batch materials. Since a glass melting furnace contains 100 tons or more of molten glass in process in order to provide a favorable operation, substantial economic problems of loss of both glass and product occurred during a change-over from one color to another. This practice of course meant that only one color of glass could be produced by the furnace at one time and in addition to being inflexible as regards color change, it required an extremely large capital investment for a single color.

HEAT TRANSFER

An additional and even more serious problem encountered in the production of glass by the full melter operation arises from attempts to produce colored glasses. The presence of coloring materials in the batch substantially reduces transmission of infrared heat rays into the melt. Thus, the intense heat produced by the combustion of a fuel whose flames are directed across the melting chamber cannot effectively penetrate the melt. If the upper surface of the glass does not transmit the rays readily, the heat of combustion is ineffective on the interior of the melt. This heat transmission problem has been so serious in the past that it has been substantially impossible to melt large masses of deeply colored glasses. Of course the skilled artisan will quickly recognize and appreciate the economic problems involved by the excessive heat lost in attempting to produce colored glasses in this manner.

*Striking.*—Therefore, to produce deeply colored glasses striking has been discovered and resorted to. This is a process wherein a melt is made which is lightly colored or clear, but wherein the glass contains a deep colorant in latent form. The deep color is actually developed by "striking" the ware after is is formed. Striking is a process of heating the ware in the annealing lehr to a temperature slightly above normal annealing temperatures, so that the latent colorant materials interact or strike to produce the deep color.

The prior art has used cyanide additives as striking constitutents. However, as the skilled artisan knows, cyanides are disadvantageous for two reasons: (1) They are volatile and resultant losses caused by heat vaporization during melting and fining are expensive; and (2) they are extremely poisonous materials and therefore are hazardous for glass making personnel. In short, they simply are not satisfactory either from an economical or safety point of view for large scale glass melting operations.

A substantial contribution would therefore be provided to the art by a colorant addition process utilizing the phenomenon of striking, and being capable of producing deeply colored glasses, but without cyanides. A much broader application of colored glasses would be provided by such an advance to the art.

*The forehearth colorant process.*—More recently the process of adding an enriched colorant frit glass to the forehearth has been developed. This process provides important advantages over the full melter method for producing colored glass. Thus, by the forehearth colorant technique, as many colors can be produced simultaneously from a single melting furnace as there are forehearths connected to the furnace. Thus, short runs of a single color can be made profitably as distinguished from the prior full melter operation. Economies of both time and reduced loss of glass are readily apparent.

Further, smaller amounts of colorants are required by the forehearth technique than by the full melter operation. Thus, in the full melter process the colorant is subjected to extremely high temperature in the melting and fining zones and these high temperatures produce substantial losses of the volatile colorant materials during the extended melting and refining operations. Temperatures in the forehearth are substantially lower than in the melting and refining zones, and thus losses by volatilization are less likely to occur by the forehearth colorant process.

Also by operating in accordance with the forehearth addition technique, conditions of firing in the melter and fining zones, rate of batch addition to the melter, and other factors can be stabilized and thereby converted into constants for improved operation. Thus, careful adjustment and stabilization of melter conditions lead to the production of consistently higher quality products. The melter conditions once stabilized remain so. This greatly improves the operation over the old full melter color operation where a change in color caused all of these factors to be upset.

However, in the past considerable problems have been encountered when attempts have been made to introduce highly concentrated colorant frit glasses into a base glass in the forehearth. Often the decolorizers used in the base glass are incompatible with the frit glass.

Further, the incompatibility between the base glass and the frit glass often produces off-gas, particularly if either the frit glass or the base glass contains a reducing or oxidizing agent. The off-gas remains in the composite glass as tiny bubbles which are called seeds or blisters in the finished ware, and cause rejects in the ware. Generally, the melting and fining zones of glass melting furnaces are maintained at substantially higher temperatures than the forehearth. Thus, melting temperatures in the range of 2750–3000° F., and fining temperatures in the range of 2300 to 2450° F. are common. These temperatures cause the viscosity of the glass to be reduced and the tiny bubbles of gas to be driven out, thus fining the molten glass.

However, temperatures in the forehearth must be reduced substantially so that the glass will have a sufficiently high viscosity to form properly. If the glass is too hot, it will be too fluid to form. Therefore, forehearth temperatures are generally reduced from the range of 2350° F. down to about 1950° F. At these temperatures the glass is of proper viscosity for forming but is too viscous to be fined and have the seeds removed.

Also, the frit glasses heretofore used often have had such high softening and liquidus temperatures as compared to the base glass that they do not melt readily and do not mix thoroughly into the base glass at forehearth temperatures. In fact, in some chromium-colored composite glasses, actual crystals of chromium oxide have been found in the final ware due to the improper admixing and melting of the high chromium frit glass with the base glass.

Also the forehearth colorant process still leaves much to be desired from an economy point of view. Thus, it requires the preparation of a frit glass. This is melted in a separate, special furnace at very high temperatures using selected materials including high ratios of colorant. The liquid frit is poured into water after forming to fracture and reduce it to granular form. After this, it is carefully dried. It is then added to a forehearth in carefully metered amounts to produce a colored composite glass.

Frit making is thus expensive and adds to the capital investment by the extra furnace required, by the special furnace operator required, by the close control required, etc.

However despite thes disadvantages, no one has been able to improve over the forehearth coloring technique up to the present time. Thus, to present knowledge no one has been able to make black glass by adding a pure colorant to the forehearth of a glass melting furnace. Further, no one has been able to advance the forehearth technique to the ultimate by putting colorant into the forehearth in the form of unprocessed powdered oxides, without having to go through the frit process, to produce black glass as an end product. In fact the prior art states that this cannot be done. For example, in U.S. Pat. 2,916,387 it is stated at column 2, lines 14 and following:

"Direct addition of a colorant material such as a colorant oxide to the glass in the pool is ineffective, because the oxide does not liquify or dissolve sufficiently rapidly to produce a uniform mixture in the time and space available."

This patent further states the defects that have been encountered in forehearth colorant addition using frit glasses. Thus, the patent continues:

"Compositions comprising a solid glass solution of a colorant, on the other hand, are generally insufficiently concentrated to be effective.

"For use in commercial processes, it is necessary that the colorant materials be sufficiently concentrated so that only a relatively small volume need be added to the molten glass to attain the requisite depth of coloration. Introduction of a large volume of a solid substance will produce a disadvantageous decrease in the temperature of the molten glass. For proper operation of the forming machinery, the molten glass must be maintained within relatively narrow temperature limits. The heat source provided to maintain the glass temperature in the forehearth, however, is of limited capacity. If substantial amounts of a solid substance such as colorant composition are introduced into the glass in the forehearth, these heat sources are insufficient to compensate for the consequent drop in temperature. The forming mechanism then fails to operate properly."

Therefore, an important advance to the art would be provided by a forehearth colorant process wherein both black and amber colored glasses could be produced from different forehearths of the same furnace.

In view of the foregoing, the following are objects of the present invention:

An important object is to provide a novel process for producing colored glass.

A further object is to provide novel black glasses.

A further object is to provide a novel process for producing black glass by the forehearth addition of a colorant to an amber base glass followed by striking the ware made from the composite glass to produce black coloration therein.

A still further object is to provide a novel process for producing black glass by adding colorant to an amber glass in the melting furnace, retaining the colorant in latent form to provide high heat transfer and effective melting and fining, and then striking the finished ware to produce the black color.

It is a further object to provide a process for producing black glass by adding powdered colorant directly to the forehearth, without the necessity of having to go through the expense of frit glass forming.

A further object is to provide novel composite black glasses by incorporating powdered colorant into a previously colored glass having a color different from that ultimately produced in the ware.

INTRODUCTION TO THE INVENTION

The various aspects of the invention are as follows:

(1) The broadest aspect comprises the addition of nickel oxide (NiO) to reduce amber glass in either a melter or the forehearth of the melter. Thereafter, the process comprises forming an article from the composite glass; and then striking the color in the article by heating the article to about 150° above normal lehr temperatures.

This aspect of the invention also encompasses the use of a powdered solubilizer for the powdered colorant oxide to unexpectedly reduce dusting, by the fact that the powdered materials are immediately wetted upon contact with the molten mass in the forehearth.

(2) A further important aspect is the novel glass compositions produced by the present invention.

STRIKING WITH NICKEL OXIDE

By this invention it has been found that nickel oxide can be added directly to the forehearth into an amber base glass to produce a composite black glass. However, the change of color to the final glass color does not take place at the point of addition. The colorant instead is present in more or less a latent form in the glass at this time. Later, after the ware is formed from the composite glass, the ware is struck to develop the final desired color of the glass. This is done by heating the ware to about 150° F. above normal lehr temperature. It is now believed, though not certain, that the coloration phenomenon is due to the formation of nickel sulfide from the nickel oxide additive and the sulfide sulfur present in the reduced amber base glass. Thus the nickel oxide takes the sulfide sulfur away from the iron. If the sulfur is present in the oxidized state, the striking will not take place. Therefore the reaction is unique in the present invention, to reduced amber base glasses.

The invention may be stated in another way. Thus, upon striking, it would appear that the nickel oxide interacts with the sulfide of the iron sulfide to produce very deeply colored nickel sulfide. Either the iron takes the oxygen, or the oxygen is set free, with both the iron and oxygen remaining in free state in the lattice of the glass. The phenomenon is not known exactly, but a black glass is certainly produced. This invention is unique in that only nickel oxide and other selected oxides, to be brought out, strike as compared to cobalt oxide and other materials that have been tried in accordance with the principles of this invention.

A further phenomenon of the invention resides in the fact that the color is present in latent form in the molten glass due to the fact that the temperature of the furnace is too high for color formation therein. Thus, after the glass is struck, the glass color will disappear upon heating the ware back up above 1650° F. Since the temperature in the melter is higher than this the glass has no color other than the normal amber color of the base glass. Yet, the heat treatment mentioned will again produce the color if repeated. The cycle can be repeated as often as desired. This invention therefore makes possible large melts of amber glass with the nickel oxide contained therein, but without detrimental effect on the heat transfer through the melt. Efficient processing is thereby provided.

In the broad aspect of the invention no processing of the nickel oxide is necessary for useful addition to the forehearth. However, within the extended scope of invention, selected solubilizers or, in effect, high temperature-sensitive wetting agents can be admixed with the colorant oxide powder. The function of these materials is twofold:

(1) To increase the wetting and solution rate of the colorant nickel oxide, making it possible to put the nickel oxide into the forehearth glass at an unexpectedly high rate of addition; and (2) It makes the colorant oxide wet so rapidly that as the nickel oxide is added, it is immediately liquified. This unexpectedly reduces dusting—a problem that, as is well-known, accompanies the addition of powdered material to a furnace zone that is gas fired.

PRACTICE OF THE PRESENT INVENTION

Before discussing the specific manner in which the invention is practiced, a description of suitable base glasses will be provided as a background.

PREPARATION OF AMBER BASE GLASSES

The present invention is premised upon the use of reduced amber base glasses. Such glasses are lightly colored and thereby adapted to be effectively melted by a radiantly heated, fuel fired atmosphere. Generally, it will be found that reduced amber glasses falling within a relatively broad composition range are suitable for the production of food and beverage containers. These glasses exhibit high absorption for ultraviolet rays, i.e. on the order of 500 m$\mu$, or less, thus preventing destruction of the food or beverage contents placed within the containers made therefrom.

The batches for these glasses contain iron and sulfur in the form of ferric oxide and sulfate sulfur. Additionally the batches contain a reducing agent such as sea coal. This converts the iron to the ferrous state and the sulfur to the sulfide state. These two substances combine into a "color complex or chromophore" in the molten glass that completely absorbs rays in the ultraviolet region and also gives the glass its distinct amber color in the visible region.

The use of sea coal as a reducing agent is advantageous since it completely burns off at glass melting and fining temperatures and therefore does not affect the color of the composite glass. Other reducing agents that can be used include elemental silicon, aluminum, and graphite, although these are more expensive.

BASE AMBER GLASS

Typical amber glasses adapted for use in the invention will fall within the following compositional range.

| Oxide: | Percent by weight |
|---|---|
| $SiO_2$ | 60–78 |
| $Al_2O_3$ | .3–18 |
| CaO | 7–18 |
| MgO | 0–9 |
| $Na_2O$ | 7–18 |
| $K_2O$ | 0–5 |
| $Li_2O$ | 0–3 |
| $R_2O(Na_2O+K_2O+Li_2O)$ | 7–24 |
| BaO | 0–5 |
| $Fe_2O_3$ | 0.04–.5 |
| Sulfides | .004–.10 |

SPECIFIC AMBER GLASS NO. I

The following is a typical specific amber glass into which nickel oxide can be added by the present invention. The glass is set forth in terms of actual oxide analysis. Carbon, the reducing agent, is omitted because it is burned off during melting and fining:

| Oxide: | Percent by weight |
|---|---|
| $SiO_2$ | 71.6 |
| $Al_2O_3$ | 2.0 |
| CaO | 11.25 |
| MgO | .15 |
| $Na_2O$ | 14.50 |
| $K_2O$ | .25 |
| $Fe_2O_3$ | .09 |
| S | .09 |

Transmittance at 500 m$\mu$, ⅛" thickness: 30%.

The conditions and procedures for making glasses of the above type are known to the art: see Table XX, B–11, page 345 of "Handbook of Glass Manufacture" by Tooley, Ogden Publishing Company, New York, N.Y., 1953.

Specifically, the above glass is preferably formed in a melting furnace at a temperature on the order of 2750° F. for melting and fining. The glass enters the forehearth of the furnace at a temperature in the range of about 2300–2400° F. Within the forehearth, the temperature of the molten glass is decreased in order to reduce the viscosity to proper forming viscosity where a forehearth outlet temperature of about 2350–2900° F. is achieved.

SPECIFIC AMBER GLASS NO. II

The following is another specific example of an amber glass into which nickel oxide can be added to produce black glass by striking in accordance with this invention.

| Oxide: | Percent by weight |
|---|---|
| $SiO_2$ | 71.97 |
| $Al_2O_3$ | 1.884 |
| $Fe_2O_3$ | .042 |
| CaO | 11.47 |
| MgO | .11 |
| $Na_2O$ | 14.08 |
| $K_2O$ | .381 |
| Lithium | .001 |

In accordance with the broad principles of the invention, the colorant technique involved can be applied to a broad range of reduced glasses containing sulfides. Accordingly, the exemplary amber glasses described are not to be considered limiting on the invention. They are suggested as appropriate however for commercial container production. These glasses exhibit high absorption capacity for ultraviolet rays, i.e., on the order of 500 m$\mu$ or less. Thus, these glasses prevent light destruction of food or beverage contents placed in containers made of the glasses.

COMPOSITE GLASS PRODUCTION

In a typical application of the present invention, a reduced amber glass is prepared in a melting furnace of several hundred tons capacity. The batch ingredients are added at one end of the melting zone and after fusion into molten glass, flow to the fining zone. The molten glass is issued out of the fining zone by being run through one or a plurality of forehearths to an appropriate forming operation. In the present process, powdered nickel oxide is metered into the molten glass at the point where the glass flows into the forehearth. This is effected by a suitable vibratory feeder and hopper arrangement or other metering device. Refractory stirrers are suitably used to admix the nickel oxide into the molten glass and homogeneously distribute the nickel oxide all through the glass so that articles made from the composite glass, such as containers or other, will have a uniform color. All of the foregoing techniques are known in the art as typified by the Hagedorn Pat. No. 3,024,121 dated Mar. 6. 1962.

Generally the melting and fining zones of glass melting furnaces are maintained at substantially higher temperatures than the forehearth. Thus, melting and fining temperatures in the range 2750–3000° F. are commonly used. These temperatures cause bubbles of occluded gas to be driven out of the melt and thus prevent seeds from being formed in the finished article or ware.

The forehearth temperatures however are lower, generally in the range of 2350° F. down to about the forming temperature of the glass, or about 1900 to 2000° F. It is because of these lower temperatures at this point that the forehearth addition processes of the prior art have often encountered substantial difficulties. Thus, due to the higher viscosity of the glass, gases which may have developed by the prior forehearth addition processes have remained in the glass as bubbles and seeds. Further, serious mixing problems have been encountered at the lower forehearth temperatures. Thus, the frit glasses as heretofore used often had such high softening and liquidus temperatures that they did not melt readily and did not mix thoroughly at forehearth temperatures. In fact, in the use of some chromium frits, actual crystals of green chromium oxide have been found in the final ware due to the lack of complete fusion of the high melting frit into the base glass.

However, by the present invention the nickel oxide is highly compatible with the base amber and has been found to admix and fuse very readily at conventional forehearth temperatures. The sulfide content of the base glass renders it receptive to the nickel oxide. The conventional stirring means and mixing baffles can be used to produce homogeneous admixture of the nickel oxide powder into the base glass to produce uniform color in the end-product glass.

*Striking.*—After the composite glass is finished in the forehearth it is passed through the forehearth outlet orifice or feeder instrumentality whatever it be, to a forming machine or the like, such as a glass container forming machine. There it is formed into a piece of ware or glass article. Then the article while still hot is passed through an annealing lehr where the temperature is retained at a controlled level to remove strains imparted by the forming operation, and thereby condition the ware for its end use. This treatment enhances the strength of the ware substantially.

Lehr temperatures are normally in the range of from about 950 to 1050° F. In accordance with the present invention, a temperature of about 100 to about 150° above lehr temperature is utilized to produce the striking, or the black nickel sulfide formation. Thus, at some point during the lehr holding cycle, the temperature will be elevated the required amount and held there for a short period of time to effect the striking. For example, in one operating procedure of the present invention the ware was held at a temperature of 1130° F. for 15 minutes to effect the striking.

*The nature of the nickel oxide.*—Unprocessed powdered nickel oxide is satisfactory. Within the broader limits, however, mesh sizes in the range of −8 to 400 can be employed with a mesh size of about −200 being generally preferred. Of course, the nickel oxide should be reasonably pure as far as being free of high melting refractory-type particles.

Rates of addition for the nickel oxide will be in the broad range to provide from about .001 to about .25% based on the composite glass. Rates in the range from about 0.1 to about .2 are usually adequate to provide glasses of sufficient black color density for most application.

The following examples illustrate some of the several runs made employing the principles of the invention.

EXAMPLE I

In this example commercial nickel oxide was added to a reduced amber glass having a composition within the broad formulation range set forth above to provide about .08% nickel oxide in the composite glass. The addition of nickel oxide was made at forehearth operating temperatures. The formation of black nickel sulfide occurred during the heat treatment of an article formed from the composite glass at a temperature of 1130° F. for 15 minutes. The black glass so produced had no transmission in the region 300–700 m$\mu$ for a thickness of 2.98 mm.

A control glass of the same composition, but with regular annealing so that striking was not effected, had a transmissivity of about 10% at 2.44 mm. thickness at 540 m$\mu$ and about 30% at 700 m$\mu$.

The composite glass had the following analysis:

| Oxide: | Percent by weight |
|---|---|
| $SiO_2$ | 71.6 |
| $Al_2O_3$ | 2.00 |
| CaO | 11.25 |
| MgO | .15 |
| $Na_2O$ | 14.50 |
| $K_2O$ | .25 |
| $Fe_2O_3$ | .09 |
| S | .09 |
| NiO | .08 |

EXAMPLE II

In this example commercial nickel oxide was also used. Forehearth addition was made to provide a theoretical level of 0.1% nickel oxide in the composite glass. The addition was made at forehearth operating temperature. The composite glass was formed into an article and the article was heat treated at about 150° F. above normal lehr temperature, e.g. about 1150° F. This produced the striking or formation of the black nickel sulfide within the glass.

The black glass that was formed had no transmission in the region between 300 and 700 m$\mu$ for a thickness of about 3 mm.

The composite glass had the following analysis:

| Oxide: | Percent by weight |
|---|---|
| $SiO_2$ | 71.97 |
| $Al_2O_3$ | 1.884 |
| $Fe_2O_3$ | .042 |
| CaO | 11.47 |
| MgO | .11 |
| $Na_2O$ | 14.08 |
| $K_2O$ | .381 |
| Lithium | .001 |
| NiO | .10 |

Examples I and II represent two black glasses that can be made from reduced amber flint base glasses by adding nickel oxide, followed by striking. Within the scope of the invention however composite glasses based on amber base glasses are to be encompassed which fall within the following broad compositional ranges:

| Oxide: | Percent by weight |
|---|---|
| $SiO_2$ | 60–78 |
| $Al_2O_3$ | .3–18 |
| CaO | 7–18 |
| MgO | 0–9 |
| $Na_2O$ | 7–18 |
| $K_2O$ | 0–5 |
| $Li_2O$ | 0–3 |
| $R_2O(Na_2O+K_2O+Li_2O)$ | 7–24 |
| BaO | 0–5 |
| $Fe_2O_3$ | .04–.5 |
| Sulfide | .004–.10 |
| NiO | .001–.25 |

The foregoing examples prove the operability of the present invention and illustrate a part of the potential glasses that can be made by applying the principles of the invention.

SOLUBILIZERS FOR THE COLORANT POWDERS

As brought out above, the present invention also encompasses the addition of powdered solubilizers in combination with the powdered nickel oxide to produce an unexpectedly rapid rate of powder addition. This enhances the rate of nickel oxide assimilation by the base glass and reduces dusting.

Thus, in accordance with this aspect of the invention, solubilizers selected from a group of alkali and alkaline earth borates, and alkali and alkaline earth silicates, and alkali and alkaline earth phosphates can be used. Specific materials include sodium silicate, sodium borate and sodium phosphate, all in powder form. When such a composite powdered mixture is introduced into the forehearth of a glass melting furnace, the heat of the forehearth immediately causes the solubilizer to be reduced to a molten condition in surrounding, wetting relationship to the nickel oxide powder. This immediately wets the nickel oxide powder and instantly starts the fusion and admixture of the nickel oxide powder into the molten base glass. By the use of suitable stirring equipment, the color is distributed homogeneously throughout the molten base glass, and composite glass of uniform color is readily accomplished.

As an extension of this aspect of the invention, an alkali metal monoxide can be added in small amounts to facilitate the wetting of the nickel oxide.

It has been found that an amount of solubilizer based on the amount of nickel oxide in the range from about .2 to about 10% by weight provides a useful additive composition.

REDUCTION OF OFF-GASES

Due to the fact that nickel oxide is not a reducing agent, off-gassing is reduced as compared to the prior art forehearth addition processes wherein the additive included a reducing agent. Upon placing a reducing agent in the forehearth, carbon dioxide and other gases are released and these have a tendency to remain in the glass as tiny bubbles because forehearth temperatures are not high enough to fine the glass. These tiny bubbles are called seeds and blisters in the finished ware. These are minimized by the present invention.

It has been found that any physically occluded gases in the powdered additives are driven off by the temperatures existent in the forehearth as the additive is laid on the surface of the molten glass.

EXTENDED SCOPE OF INVENTION

The foregoing disclosure has been directed to the use of nickel oxide as a forehearth additive for striking because of the unique characteristics of this material in producing intense black glasses by using minimum amounts of the additive. However, within the scope of the invention certain extensions are encompassed. Thus copper oxide when added to a reduced amber in the forehearth will also strike to produce copper sulfide which imparts a deep black color. In a further extension of the invention arsenic oxide, antimony oxide, lead oxide, manganese oxide, cerium oxide and molybdenum oxide can be used in the manner set forth to form metal sulfides thereby producing amber glasses in color shades ranging from yellow, orange, and black.

Several runs have been made to verify the above. Thus addition of .05% copper oxide to a reduced amber glass also produced black glass by striking. Lead monosilicate was added to an amber glass in the range from 1 to 2%. Black glasses were produced after striking.

Further examples are as follows:

EXAMPLE III

In this example $Cu_2O$ was added to a reduced amber glass having a composition within the broad formulation range set forth above, to achieve 0.2% $Cu_2O$ in the final glass. The addition was made at forehearth operating temperatures. The formation of copper sulfide was effected by heat treating an article made from the glass to produce a black color.

The composite glass had the following analysis:

| Oxide: | Percent by weight |
|---|---|
| $SiO_2$ | 71.6 |
| $Al_2O_3$ | 2.00 |
| CaO | 11.25 |
| MgO | .15 |
| $Na_2O$ | 14.50 |
| $K_2O$ | .25 |
| $Fe_2O_3$ | .09 |
| S | .09 |
| $Cu_2O$ | .2 |

EXAMPLE IV

In this example PbO was added to a reduced amber glass to achieve 0.5% lead oxide in the final glass. The addition was made at forehearth operating temperatures. The formation of lead sulfide was effected by heat treating an article made from the glass to produce a black color.

The composite glass had the following analysis:

| Oxide: | Percent by weight |
|---|---|
| $SiO_2$ | 71.6 |
| $Al_2O_3$ | 2.00 |
| CaO | 11.25 |
| MgO | .15 |
| $Na_2O$ | 14.50 |
| $K_2O$ | .25 |
| $Fe_2O_3$ | .09 |
| S | .09 |
| PbO | 0.5 |

Within the total scope of the invention, the metal oxide can be added either to the forehearth, or to the batch materials of a reduced amber glass.

It is an advantage of the present invention that losses by volatilization are held to a minimum. Therefore substantially the exact amount of additive desired in the ultimate glass can be utilized. Very little allowance for loss need be made.

We claim:
1. A process of producing a black glass article comprising the steps of
    forming a molten body of soda-lime-silica amber glass containing iron and sulfur as the amber color-producing ingredients from glass-forming materials under reducing conditions in a melter having a forehearth,
    flowing the molten glass from the melter into the forehearth,
    adding a powdered nickel oxide to the molten glass in the forehearth,
    admixing the nickel oxide homogeneously throughout the molten glass,
    issuing the mixed molten glass from the forehearth as a reduced amber-colored glass,
    forming an article from the reduced amber glass, and
    heat treating the article at a temperature and for a time sufficient to react the nickel and the sulfur to produce black nickel sulfide as the ultimate colorant in the article.
2. The process as defined in claim 1 wherein the powdered nickel oxide is mixed with a minor amount of a dry, powdered, high-temperature-responsive wetting agent for said nickel oxide selected from the group consisting of alkali and alkaline earth silicates, alkali and alkaline earth borates, and alkali and alkaline earth phosphates.

3. A process of producing a black glass article comprising the steps of melting under reducing conditions in a furnace having a forehearth, a glass having a composition within the range

| Oxidant: | Percent by weight |
|---|---|
| $SiO_2$ | 60–78 |
| $Al_2O_3$ | .3–18 |
| CaO | 7–18 |
| MgO | 0–9 |
| $Na_2O$ | 7–18 |
| $K_2O$ | 0–5 |
| $Li_2O$ | 0–3 |
| $R_2O(Na_2O, K_2O, Li_2O)$ | 7–24 |
| BaO | 0–5 |
| $Fe_2O_3$ | .04–.5 |
| Sulfides | .004–10 | flowing the molten glass into the forehearth, adding powdered nickel oxide to the molten glass in the forehearth in an amount sufficient to provide a nickel oxide content in the range from about .001 to .25% based on the weight of the composite glass so formed, admixing the nickel oxide homogeneously throughout the molten glass, issuing the molten glass from the forehearth as a reduced amber glass and forming an article therefrom, and heat treating the article at a temperature in the range from about 1050–1200° F. for a period of time sufficient to produce nickel sulfide in the glass and thereby convert the amber glass to its ultimate black color.

4. A process of producing a reduced amber-colored glass article which may be converted to a black glass by heat-striking comprising the steps of forming a molten body of reduced soda-lime-silica amber glass containing iron and sulfur as the amber color-forming ingredients from a batch of glass-forming materials, adding nickel oxide colorant to the molten glass, homogenizing the nickel oxide throughout the molten glass, and forming a reduced amber-colored article from the glass, said glass possessing the property of being responsive to heat-striking to convert the amber color of said article to a final black color when said article is subjected to a temperature and for a period of time sufficient to produce nickel sulfide in the glass.

5. A process of producing colored glass articles comprising the steps of forming a molten body of soda-lime-silica amber glass containing iron and sulfur as the amber color-producing ingredients from a batch of glass-forming ingredients under reducing conditions, adding to the molten glass a powdered metal oxide selected from the group consisting of nickel oxide, arsenic oxide, antimony oxide, lead oxide, manganese oxide, cerium oxide and molybdenum oxide, admixing the colorant oxide into the molten glass to provide a reduced amber color throughout the mass, forming an article from the reduced amber glass, and heat-treating the article at a temperature and for a time sufficient to react the metal of said metal oxide with said sulfur to produce a metal sulfide as the final colorant in the glass article.

6. A process of producing a colored glass article comprising the steps of melting under reducing conditions in a furnace having a forehearth, a glass having a composition within the range

| Oxide: | Percent by weight |
|---|---|
| $SiO_2$ | 60–78 |
| $Al_2O_3$ | .3–18 |
| CaO | 7–18 |
| MgO | 0–9 |
| $Na_2O$ | 7–18 |
| $K_2O$ | 0–5 |
| $Li_2O$ | 0–3 |
| $R_2O(Na_2O, K_2O, Li_2O)$ | 7–24 |
| BaO | 0–5 |
| $Fe_2O_3$ | .04–.5 |
| Sulfides | .004–.10 | flowing the molten glass into the forehearth, adding a colorant to the molten glass in the forehearth, said colorant being an oxide selected from the group consisting of nickel oxide, arsenic oxide, antimony oxide, lead oxide, manganese oxide, cerium oxide and molybdenum oxide, said colorant being added in an amount sufficient to provide a colorant oxide content in the range from about .001 to 0.5% based on the weight of the molden glass, admixing the colorant homogeneously throughout the molten glass, issuing the molten glass from the forehearth as a reduced amber glass and forming an article therefrom, and heat treating the article at a temperature and for a time sufficient to react the metal of the metal oxide with the sulfur in the glass to produce a metal sulfide as the final colorant.

7. A colored glass article formed by the process defined in claim 5.

References Cited

UNITED STATES PATENTS

| | | | |
|---|---|---|---|
| 2,688,561 | 9/1954 | Armistead | 106—52 XR |
| 2,693,422 | 11/1954 | Duncan et al. | 106—52 |
| 2,699,399 | 1/1955 | Armistead | 106—54 XR |
| 2,956,892 | 10/1960 | Duncan | 106—52 |
| 3,003,886 | 10/1961 | Pither | 65—32 XR |
| 3,024,121 | 3/1962 | Hegedorn | 65—134 XR |
| 3,146,114 | 8/1964 | Kivlign | 106—52 XR |
| 3,188,217 | 6/1965 | Elmer et al. | 106—52 |
| 3,364,041 | 1/1968 | Swain et al. | 106—52 |
| 3,364,042 | 1/1968 | Swain et al. | 106—54 XR |

OTHER REFERENCES

Coloured Glasses, by Woldemar A. Weyl, 1959, Dawson is of Pall Mall, London.

FRANK W. MIGA, Primary Examiner

U.S. Cl. X.R.

65—30, 32, 33, 134, 157, 346

UNITED STATES PATENT OFFICE
CERTIFICATE OF CORRECTION

Patent No. 3,513,003          Dated May 19, 1970

Inventor(s) FRIEDRICH W. HAMMER and JOHN JASINSKI

It is certified that error appears in the above-identified patent and that said Letters Patent are hereby corrected as shown below:

Col. 3, line 32, "thes" should be ---these---; Col. 3, line 66, after "as", insert ---a---. Col. 4, line 29, after "to", insert ---a---; "reduce" should be ---reduced---. Col. 6, line 36, "2900" should be ---1900---.

Signed and sealed this 22nd day of April 1975.

(SEAL)
Attest:

RUTH C. MASON
Attesting Officer

C. MARSHALL DANN
Commissioner of Patents
and Trademarks